United States Patent
Kang et al.

(10) Patent No.: US 9,838,071 B2
(45) Date of Patent: Dec. 5, 2017

(54) METHOD OF REPEATEDLY TRANSMITTING/RECEIVING SYSTEM INFORMATION AND APPARATUS THEREFOR

(71) Applicant: KT CORPORATION, Gyeonggi-do (KR)

(72) Inventors: Seunghyun Kang, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/338,545

(22) Filed: Oct. 31, 2016

(65) Prior Publication Data

US 2017/0126274 A1    May 4, 2017

(30) Foreign Application Priority Data

| | | |
|---|---|---|
| Nov. 4, 2015 | (KR) | 10-2015-0154785 |
| Nov. 10, 2015 | (KR) | 10-2015-0157314 |
| Nov. 12, 2015 | (KR) | 10-2015-0159232 |
| Nov. 16, 2015 | (KR) | 10-2015-0160705 |
| Nov. 18, 2015 | (KR) | 10-2015-0161483 |
| Mar. 8, 2016 | (KR) | 10-2016-0027589 |

(51) Int. Cl.

| | |
|---|---|
| *H04B 1/7136* | (2011.01) |
| *H04W 4/00* | (2009.01) |
| *H04W 74/00* | (2009.01) |
| *H04B 1/715* | (2011.01) |
| *H04B 1/7143* | (2011.01) |
| *H04J 11/00* | (2006.01) |

(52) U.S. Cl.
CPC ........... *H04B 1/7136* (2013.01); *H04B 1/715* (2013.01); *H04B 1/7143* (2013.01); *H04J 11/00* (2013.01); *H04W 4/005* (2013.01); *H04W 74/006* (2013.01); *H04B 2001/7154* (2013.01); *H04B 2001/71365* (2013.01)

(58) Field of Classification Search
CPC .................. H04B 1/7136; H04B 1/715; H04B 2001/71365; H04B 2001/7154; H04W 4/005; H04W 74/006
USPC ....... 375/295, 316, 259, 132, 133, 134, 135, 375/136, 137
See application file for complete search history.

(56) References Cited

U.S. PATENT DOCUMENTS

| | | | |
|---|---|---|---|
| 9,654,902 B2* | 5/2017 | Oh .................... | H04W 4/005 |
| 2015/0333880 A1* | 11/2015 | Yi ..................... | H04L 5/001 370/329 |
| 2016/0088594 A1* | 3/2016 | Xiong ................ | H04W 4/005 370/329 |

* cited by examiner

*Primary Examiner* — Siu Lee
(74) *Attorney, Agent, or Firm* — IP Legal Services, LLC

(57) ABSTRACT

Disclosed are a method and an apparatus for transmitting system information for an machine type communication (MTC) user equipment (UE) and, more particularly, a method and an apparatus for performing frequency hopping of system information for the MTC UE. A base station (BS) determines an index of a narrow band used to firstly transmitting system information based on a physical cell ID and a number of narrow bands according to a system bandwidth and configures a frequency hopping pattern based on the index of the first narrow band, the number of narrow bands according to the system bandwidth, and a number of narrow bands used for frequency hopping.

15 Claims, 10 Drawing Sheets

FIG.2

| b0,b1,b2 | p0,p1,p2 | s0,s1,...,s7 | z0,z1,...,z9 |
|---|---|---|---|
| BW<br>3 bits | PHICH<br>3 bits | SFN<br>8 bits | spare<br>10 bits |

METHOD OF REPEATEDLY TRANSMITTING/RECEIVING SYSTEM INFORMATION AND APPARATUS THEREFOR

CROSS REFERENCE TO RELATED APPLICATION

This application claims priority from Korean Patent Application Nos. 10-2015-0154785, 10-2015-0157314, 10-2015-0159232, 10-2015-0160705, 10-2015-0161483, & 10-2016-0027589, filed on Nov. 4, 2015, Nov. 10, 2015, Nov. 12, 2015, Nov. 16, 2015, Nov. 18, 2015, & Mar. 8, 2016, which are hereby incorporated by reference for all purposes as if fully set forth herein.

BACKGROUND OF THE INVENTION

1. Field of the Invention

The present disclosure relates to a method and an apparatus for transmitting system information for an machine type communication (MTC) terminal. More specifically, the present disclosure relates to a method and an apparatus for configuring transmission resources of system information for an MTC terminal and performing frequency hopping.

2. Description of the Prior Art

Machine Type Communication (MTC) denotes communication between a device and an object without human intervention. In a viewpoint of 3rd generation partnership projection (3GPP), "machine" refers to an entity that does not require a direction control or human intervention, and "MTC" denotes one type of data communication including one or more machines.

A smart meter or a vending machine equipped with a mobile communication module is a typical example of a machine. A portable User Equipment (UE) having an MTC function is also considered as one type of machine since smart phones automatically access a network and communicate according to a user location or a user condition without any control or intervention of the user.

In order to support an MTC UE having expanded coverage, System Information (SI) should be repeatedly transmitted using a plurality of subframes in a time domain. When the SI is repeatedly transmitted using most downlink subframes for the UE having the expanded coverage on every transmission period, Physical Downlink Shared CHannel (PDSCH) transmission resources for Dedicated Traffic CHannel (DTCH) transmission become running out. To solve the above problem, an intermittent repetitive transmission method is proposed. The intermittent repetitive transmission method repeatedly transmit the SI only using a particular subframe or only during a particular transmission period.

Accordingly, it is required to develop a frequency hopping pattern for repeatedly transmitting the SI to the MTC UE and also avoiding interference from SI transmitted from an adjacent base station (BS).

SUMMARY OF THE INVENTION

The present disclosure made according to the aforementioned demand provides a method and an apparatus for setting transmission resources for transmitting system information for an MTC UE and transmitting and receiving the system information by using the corresponding transmission resources.

Further, the present disclosure provides a method and an apparatus for configuring a frequency hopping pattern for transmitting system information for a MTC UE and repeatedly transmitting/receiving the system information for the MTC UE.

In accordance with an aspect of the present disclosure, a method of repeatedly transmitting system information by a Base Station (BS) is provided. The method includes: determining an index of a first narrow band configuring a frequency hopping pattern based on a physical cell ID and a number of narrow bands according to a system bandwidth; determining indexes of remaining narrow bands configuring the frequency hopping pattern based on the physical cell ID, the number of narrow bands according to the system bandwidth, and a number of narrow bands used for frequency hopping; and repeatedly transmitting the system information through a narrow band corresponding to the index of the narrow band configuring the frequency hopping pattern.

In accordance with another aspect of the present disclosure, a method of repeatedly receiving system information by a User Equipment (UE) is provided. The method includes: firstly receiving the system information through a narrow band of an index determined based on a physical cell ID and a number of narrow bands according to a system bandwidth; and receiving the system information through the narrow band of the index determined based on the physical cell ID, the number of narrow bands according to the system bandwidth, and a number of narrow bands used for frequency hopping.

In accordance with another aspect of the present disclosure, a Base Station (BS) for repeatedly transmitting system information is provided. The BS includes: a controller configured to determine an index of a first narrow band configuring a frequency hopping pattern based on a physical cell ID and a number of narrow bands according to a system bandwidth, and determine indexes of remaining narrow bands configuring the frequency hopping pattern based on the physical cell ID, the number of narrow bands according to the system bandwidth, and a number of narrow bands used for frequency hopping; and a transmitter configured to transmit system information through a narrow band corresponding to an index of the narrow band configuring the frequency hopping pattern.

In accordance with another aspect of the present disclosure, a User Equipment (UE) for repeatedly receiving system information is provided. The UE firstly receives system information through a narrow band of an index determined based on a physical cell ID and a number of narrow bands according to a system bandwidth, and receives the system information through the narrow band of the determined index based on the physical cell ID, the number of narrow bands according to the system bandwidth, and a number of narrow bands used for frequency hopping.

According to the present disclosure, transmission resources for transmitting system information for the MTC UE may be set and the system information may be transmitted/received using the corresponding transmission resources.

Further, a frequency hopping method for the repetitive transmission of the system information to an MTC UE having an expanded coverage is provided, and thus adjacent BSs may repeatedly transmit system information by using different resources with respect to a repeatedly transmitted subframe through frequency hopping.

BRIEF DESCRIPTION OF THE DRAWINGS

The above and other objects, features, and advantages of the present disclosure will be more apparent from the following detailed description taken in conjunction with the accompanying drawings, in which:

FIG. 2 illustrates a configuration of an MIB;

DETAILED DESCRIPTION OF THE EXEMPLARY EMBODIMENTS

Figure 1:
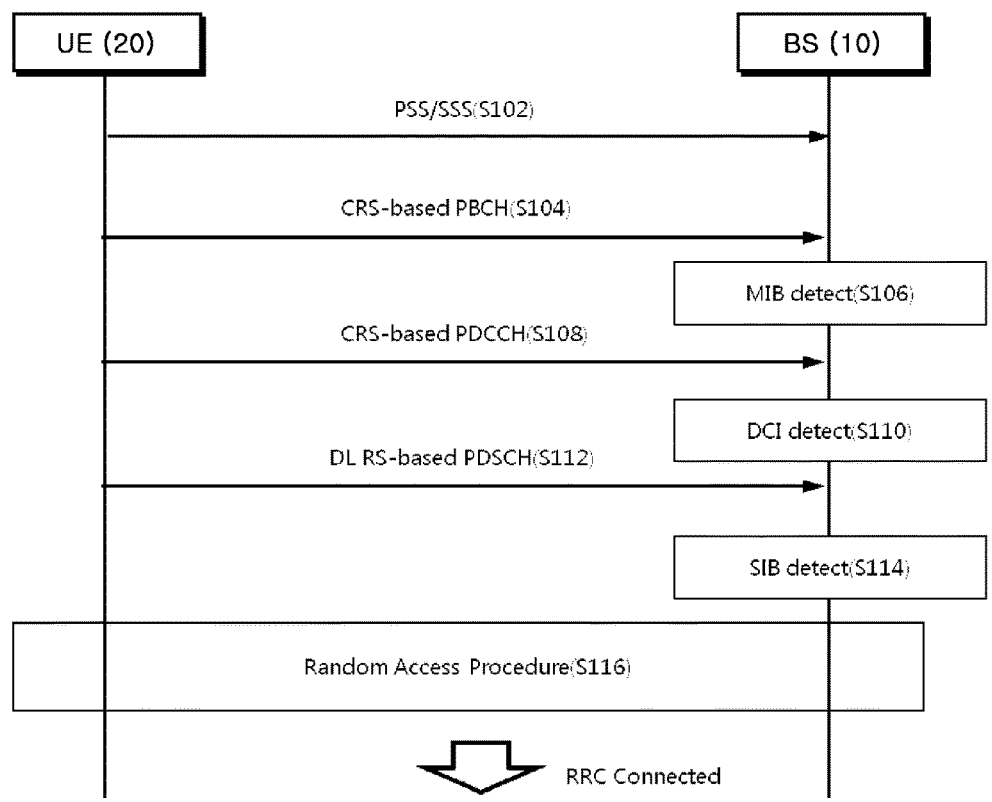
FIG. 1 illustrates an exemplary initial cell access process of a UE.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure a detailed description of known functions and configurations incorporated herein will be omitted when it is determined that the description may make the subject matter of the present disclosure rather unclear.

In the present specifications, an MTC UE may refer to a low cost and low complexity UE, a UE supporting coverage enhancement, or the like. Alternatively, in the present specifications, the MTC UE may refer to a UE that is defined as a predetermined category for supporting the low cost (or low complexity) and/or the coverage enhancement.

In other words, in the present specifications, the MTC UE may refer to a newly defined 3GPP Release-13 low cost (or low complexity) UE category/type, which executes MTC-related operations based on LTE. Alternatively, in the present specifications, the MTC UE may refer to a UE category/type that is defined in or before 3GPP Release-12 that supports the enhanced coverage compared to the existing LTE coverage or supports low power consumption, or may refer to a newly defined Release-13 low cost (or low complexity) UE category/type.

A wireless communication system according to the present disclosure is widely deployed to provide various communication services, such as a voice, packet data, and the like.

FIG. 1 illustrates an example of an initial cell access process of a UE.

Referring to FIG. 1, a wireless communication system includes a User Equipment (UE) 10 and a Base Station (BS) 20 that performs uplink communication (for example, Physical Uplink Shared CHannel (PUSCH), Physical Uplink Control CHannel (PUCCH), Physical Random Access CHannel (PRACH), and the like) and downlink communication (for example, Physical Downlink Shared CHannel (PDSCH), Physical Downlink Control CHannel (PDCCH), Enhanced Physical Downlink Control CHannel (EPDCCH), Physical HARQ Information CHannel (PHICH), Physical Control Format Information CHannel (PCFICH), Physical Broadcast CHannel (PBCH), and the like) with the UE 10.

Throughout the specifications, the UE 10 is an inclusive concept indicating a UE utilized in wireless communication. The UE 10 should be construed as a concept including all of a UE in wideband code division multiple access (WCDMA), long term evolution (LTE), high speed packet access (HSPA), and the like, and a Mobile station (MS), a User Terminal (UT), a Subscriber Station (SS), a wireless device, and the like in global systems for mobile communication (GSM).

The BS 20 or a cell may generally refer to a station that communicates with the UE 10. The BS 20 may be referred to as another term such as a node-B, an eNodeB (evolved Node-B), a sector, a site, a BTS (Base Transceiver System), an access point, a relay node, a RRH (Remote Radio Head), a RU (Radio Unit), a small cell, and the like.

Further, the BS 20 should be construed as an inclusive meaning indicating some areas or functions covered by a Base Station Controller (BSC) in CDMA, a nodeB in WCDMA, an eNB or a sector (site) in LTE, and including all of various coverage areas such as a megacell, macrocell, microcell, picocell, femtocell, RRH, and relay node communication range.

Each of the above mentioned various cells has a BS that controls a corresponding cell. Thus, the BS may be construed in two ways. i) The BS may indicate a device itself that provides a megacell, a macrocell, a microcell, a picocell, a femtocell, or a small cell in connection with a wireless area or, ii) the wireless area itself. In i), all devices that make devices providing predetermined wireless areas controlled by the same entity or interact to cooperatively configure the wireless areas are referred to as the BSs. Based on a configuration type of the wireless area, an eNB, an RRH, an antenna, an RU, a Low Power Node (LPN), a point, a transmission/reception point, a transmission point, a reception point, and the like may be embodiments of the BS. In ii), the wireless area itself that receives or transmits a signal from a perspective of a UE or a neighboring BS, may be indicated as the BS.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as the BS.

In the specifications, the UE and the BS are used as two inclusive transceiving subjects to embody the technology and technical idea described in the specifications, and the UE and the BS may not be limited by a predetermined term or word. In the specification, the UE and the BS are used as two (uplink or downlink) inclusive transceiving subjects to embody the technology and technical idea described in the specifications, and the UE and the BS may not be limited by a predetermined term or word. Here, Uplink (UL) refers to a scheme for transmitting and receiving data to and from the BS by the UE, and Downlink (DL) refers to a scheme for transmitting and receiving data to and from the UE by the BS.

There is no limitation in a multiple access scheme applied to the wireless communication system. Various multiple access schemes may be used. Such multiple access schemes include Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA. An embodiment of the present disclosure may be applicable to resource allocation in an asynchronous wireless communication field that is evolved to LTE and LTE-advanced via GSM, WCDMA, and HSPA. Furthermore, embodiments of the present disclosure may be applicable to resource allocation in a synchronous wireless communication field that is evolved to CDMA, CDMA-2000, and UMB. The present disclosure should not be construed to be limited or restricted to a particular wireless communication field, and the present disclosure should be construed to include all technical fields to which the idea of the present invention can be applied.

Uplink transmission and downlink transmission may use a Time Division Duplex (TDD) scheme in which transmission is performed based on different times, or the uplink transmission and downlink transmission use a Frequency Division Duplex (FDD) scheme in which transmission is performed based on different frequencies.

Further, in a system such as LTE and LTE-A, a standard may be developed by configuring an uplink and a downlink based on a single carrier or a pair of carriers. In the uplink and the downlink, control information is transmitted through a control channel such as a Physical Downlink Control CHannel (PDCCH), a Physical Control Format Indicator CHannel (PCFICH), an Enhanced Physical Downlink Control CHannel (EPDCCH), or the like. It may further be configured by data channels such as a Physical Downlink Shared CHannel (PDSCH), a Physical Uplink Shared CHannel (PUSCH), and the like in order to transmit data.

Meanwhile, the control information may also be transmitted using an Enhanced PDCCH or Extended PDCCH (EPDCCH).

In the present specifications, a cell may refer to the coverage of a signal transmitted from a transmission/reception point, a component carrier having the coverage of the signal transmitted from the transmission/reception point (transmission point or transmission/reception point), or the transmission/reception point itself.

The wireless communication system to which the embodiments are applied may be a Coordinated Multi-point Transmission/Reception System (CoMP system) in which two or more transmission/reception points transmit a signal in cooperation with each other, a coordinated multi-antenna transmission system, or a coordinated multi-cell communication system. The CoMP system may include at least two multi-transmission/reception points and UEs.

The multi-transmission/reception point may be a BS or a macro cell (hereinafter, referred to as an "eNB") and at least one RRH that is connected to the eNB through an optical cable or an optical fiber. The multi-transmission/reception point may be controlled through a wired link and has high transmission power or low transmission power within a macro cell area.

Hereinafter, the downlink refers to communication or a communication path from the multi-transmission/reception point to the UE, and the uplink refers to communication or a communication path from the UE to the multi-transmission/reception point. In the downlink, a transmitter may be a part of the multiple transmission/reception point and a receiver may be a part of the UE. In the uplink, a transmitter may be a part of the UE and a receiver may be a part of the multiple transmission/reception point.

Hereinafter, a situation in which a signal is transmitted and received through a channel such as a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" may be used as the expression "an EPDCCH is transmitted or received, or a signal is transmitted or received through an EPDCCH".

That is, a physical downlink control channel used herein may indicate a PDCCH or an EPDCCH, and may include both the PDCCH and the EPDCCH.

In addition, for ease of description, the EPDCCH according to an embodiment of the present disclosure may be applied to the part described using the PDCCH and the PDCCH according to an embodiment of the present disclosure may be applied to the part described using the EPDCCH.

Meanwhile, higher layer signaling described below includes RRC signaling that transmits RRC information including an RRC parameter.

The BS 20 performs downlink transmission to UEs. The eNB may transmit a Physical Downlink Shared Channel (PDSCH), which is a primary physical channel for unicast transmission. The BS 20 may transmit a Physical Downlink Control Channel (PDCCH) for i) transmitting downlink control information, such as scheduling required for reception of a PDSCH, and ii) scheduling grant information for transmission of an uplink data channel (for example, a Physical Uplink Shared Channel (PUSCH)). In the following description, signal transmission/reception through each channel is expressed as transmission or reception of the channel itself.

Further, the BS 20 may be called a Transmission Point (TP) from a viewpoint of transmitting downlink communication to the UE 10, called a Reception point (RP) from a viewpoint of receiving uplink communication from the UE 10. The BS 20 may be called a point or a transmission and reception point.

Machine Type Communication (MTC) is defined as communication between a device and an object without human intervention. In a viewpoint of 3GPP, "machine" refers to as an entity that does not require direction control or human intervention. "MTC" is defined as one type of data communication including one or more machines. Although a smart meter or a vending machine equipped with a mobile communication module has been mentioned as a typical example of a machine, a portable terminal having an MTC function is considered to be one type of machine since smart phones automatically access a network and communicate according to a location or situation of a user without any control or user intervention.

As an LTE network expands, a mobile communication service provider desires to minimize the number of Radio Access Terminals (RATs) to reduce maintenance costs of the network. However, MTC products based on the typical GSM/GPRS network have increased, and MTC using a low data transmission rate may be provided with low costs. Accordingly, the mobile communication service provider uses the LTE network for normal data transmission and uses the GSM/GPRS network for MTC. As a result, a problem is generated in that two PRTs should be managed, which causes the inefficient use of frequency bands and reduces the profits of the mobile communication service provider.

In order to solve such a problem, the MTC UE using the LTE network should be replaced with the cheap MTC UE using the GSM/EGPRS network. Thus, various requirements to reduce the price of the LTE MTC UE are discussed in a 3GPP RAN WG1 standard meeting. Further, in the standard meeting, various functions that can be provided to meet the requirements are written in a document (TR 36.888).

A main item related to a physical layer standard change that is currently discussed in 3GPP to support the cheap LTE MTC UE may be, for example, a technology such as narrow band supporting/Single RF chain/Half duplex FDD/Long Discontinued Reception (DRX). However, such methods for reducing the costs may deteriorate the performance of the MTC UE compared to the conventional LTE UE.

Further, about 20% of MTC UEs that support an MTC service such as smart metering are installed in a "Deep indoor" environment such as a basement, so that the coverage of the LTE MTC UE should be improved by 15 dB compared to the coverage of the typical LTE UE for successful MTC data transmission.

Table 1 below expresses a link budget of each physical channel as a Maximum Coupling Loss (MCL) value. Since the MCL value is the smallest in a case of an FDD PUSCH, a target MCL value for a 15 dB improvement is 140.7+15=155.7 dB.

TABLE 1

| Physical channel name | PUCCH (1A) | PRACH | PUSCH | PDSCH | PBCH | SCH | PDCCH (1A) |
|---|---|---|---|---|---|---|---|
| MCL (FDD) [dB] | 147.2 | 141.7 | 140.7 | 145.4 | 149.0 | 149.3 | 146.1 |
| MCL (TDD) [dB] | 149.4 | 146.7 | 147.4 | 148.1 | 149.0 | 149.3 | 146.9 |

Table 2 below shows coverage improvement of each physical channel required to meet the target MCL value.

TABLE 2

| Physical channel name | PUCCH (1a) | PRACH | PUSCH | PDSCH | PBCH | SCH | PDCCH (1A) |
|---|---|---|---|---|---|---|---|
| Required improvement [dB] | 8.5 | 14.0 | 15.0 | 10.3 | 6.7 | 6.4 | 9.6 |

As described above, in order to improve coverage while reducing the costs of the LTE MTC UE, various methods for robust transmission such as PSD boosting or a low coding rate and time domain repetition are considered for each physical channel.

Requirements of a low-price MTC UE based on LTE are as follows.

A data transmission rate should meet at least a data transmission rate provided by an EGPRS-based MTC UE, that is, downlink 118.4 kbps and uplink 59.2 kbps.
Frequency efficiency should be improved innovatively compared to the GSM/EGPRS MTC UE.
A provided service area should not be smaller than an area provided by the GSM/EGPRS MTC UE.
Power consumption should not be larger than that of the GSM/EGPRS MTC UE.
A legacy LTE UE and the LTE MTC UE should be used in the same frequency.
Existing LTE/SAE network is reused.
Optimization is performed in a TDD mode as well as in an FDD mode.

The low-price LTE MTC UE should support limited mobility and a low power consumption module.

The BS can allocate resources such as a maximum of 6 PRB pairs in one subframe to the MTC UE and an available maximum Transport Block Size (TBS) is 1000 bits.

Referring to FIG. 1, in an initial cell access process of the UE, the UE 10 receives a Primary Synchronization Signal (PSS) and a Secondary Synchronization Signal (SSS), which are synchronization signals transmitted by the BS 20 in step S102. In LTE Frequency Division Duplex (FDD), the PSS may be transmitted in the last symbols (#n) of the first slots of subframe #0 and subframe #5 in one radio frame (10 ms), and the SSS may be transmitted in a previous symbol (#n−1) of the last symbol (#n) of the first slots of subframe #0 and subframe #5. In LTE TDD, the PSS/SSS may be transmitted at different positions from those in FDD.

Slot timing and an SSS scrambling code are acquired by PSS acquisition, and frame timing and a cell group ID sequence are acquired by SSS acquisition.

When the UE 10 detects the PSS and the SSS, the UE 10 may acquire a cell ID and downlink synchronization information and may perform additional synchronization and existing control channel decoding by using a Cell-specific Reference Signal (CRS) on the basis of information acquired by the PSS/SSS.

The UE 10 receives a signal from the BS 20 through a PBCH based on a CRS in step S104, and the UE 10 extracts a Master Information Block (MIB) transmitted through the PBCH in step S106. As described below with reference to FIG. 2, the MIB may include information indicating a bandwidth of a cell, information indicating a PHICH configuration, and information indicating a system frame number. The UE 10 may know resources to which the PDCCH is allocated based on the information included in the MIB.

The UE 10 receives a signal from the BS 20 through a PDCCH based on a CRS in step S108, and the UE 10 extracts Downlink Control Information (DCI) transmitted through the PDCCH in step S110. The DCI may be control information for a PDSCH through which the SIB is transmitted, and the DCI may be transferred through a common search space. In other words, a PCFICH is decoded and how many symbols are allocated for the PDCCH is detected. The DCI for SIB1 is decoded from the PDCCH. The SIB1 is decoded, and time domain scheduling information for other SIBs is acquired.

The UE 10 receives a signal from the BS through a PDSCH based on a DL RS and based on the DCI in step S112 and extracts another SIB transmitted through the PDSCH in step S114. The DCI for SIBs other than SIB1 is decoded from the PDCCH. The other SIBs are decoded.

Thereafter, the UE 10 and the BS 20 may perform a random access procedure in step 116, and the UE 10 may become an RRC connected state from an RRC idle state.

System information that the BS 20 transmits to the PBCH is referred to as a Master Information Block (MIB).

FIG. 2 illustrates configuration of MIB.

Referring to FIG. 2, the MIB may include "dl-Bandwidth" field (BW), "phich-Config" field (PHICH), "systemFrameNumber" field (SFN), and "spare" field (spare).

```
-- ASN1START
MasterInformationBlock ::=      SEQUENCE {
    dl-Bandwidth                ENUMERATED {
                                    n6, n15, n25, n50, n75, n100},
    phich-Config                PHICH-Config,
    systemFrameNumber           BIT STRING (SIZE (8)),
    spare                       BIT STRING (SIZE (10))
}
-- ASN1STOP
```

The "dl-Bandwidth" field may be used to indicate a bandwidth of a cell in the unit of Resource Blocks (RBs). In a LTE and LTE-A system, one cell may include 6, 15, 25, 50, 75, or 100 RBs, and 3-bit "dl-Bandwidth" field may be used to indicate a value of one thereof.

The "phich-Config" field may be used to indicate resources of a PHICH through which Acknowledgement/Negative Acknowledgement (A/N) for the PUSCH is transmitted. The "phich-Config" field may include 3 bits, including 1 bit indicating PHICH duration and 2 bits indicating PHICH resources. The PHICH duration may indicate the number of Orthogonal Frequency Division Multiplex (OFDM) symbols to which the PHICH is allocated. The (normal) PHICH may be located at first one OFDM symbol of the subframe when a value of the PHICH duration is 0, and the (extended) PHICH may be located at the first two or three OFDM symbols of the subframe when the value is 1. The PHICH resources may indicate resource occupancy of the PHICH or indicate a value of ⅙, ½, 1, or 2.

The "systemFrameNumber" field may be used to indicate a 10-bit System Frame Number (SFN). Here, the SFN has a value from 0 to 1023, that is, a repetitive value from 0 to 1023 on a 1024 frame period. 8 bits of the 10-bit SFN may be indicated by the "systemFrameNumber" field, and 2 bits may be implicitly acquired in a decoding of the PBCH corresponding to a period of four radio frames (40 ms).

Accordingly, the "systemFrameNumber" field may include 8 bits from a Most Significant Bit (MSB) in the SFN.

Further, a 10-bit "spare" field is reserved.

The MIB is configured in a total of 24 bits. For PBCH transmission including the MIB, a coding process as shown in FIG. 1 is performed.

Figure 3:
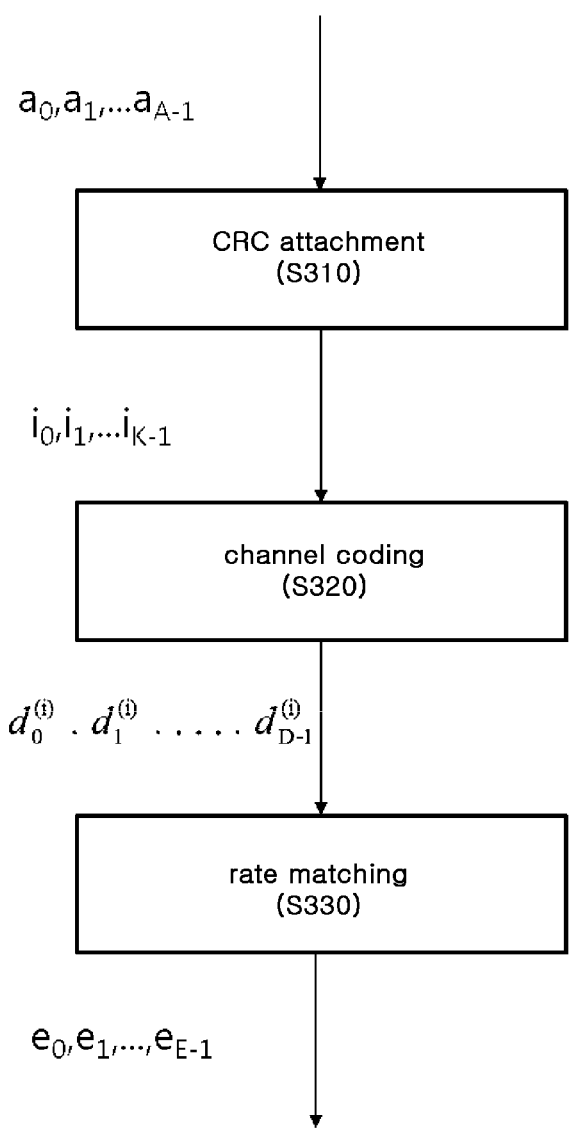
FIG. 3 illustrates a PDCCH coding method.

FIG. 3 illustrates a PDCCH coding method.

Referring to FIG. 3, 16-bit Cyclic Redundancy Check (CRC) is first generated using a 24-bit MIB (a0, a1 ... and aA−1). At this time, in the generated 16-bit CRC, a 16-bit CRC mask set according to the number of transmission antennas is scrambled. The scrambled 16-bit CRC is added after the 24-bit MIB and thus a total of 40-bit information bit blocks (i0, i1 ... iK−1) are generated in step S310.

40-bit information bits are encoded using a Tail Biting Convolutional Code (TBCC) in step S320.

A length of TBCC-encoded mother code words ($d_0^{(i)}$, $d_1^{(i)}$, ..., $d_{D-1}^{(i)}$) is 120 bits. The mother code is repeated as code words (e0, e1, ..., eE−1) of 1920 bits through a rate matching process in step S330.

Figure 4:
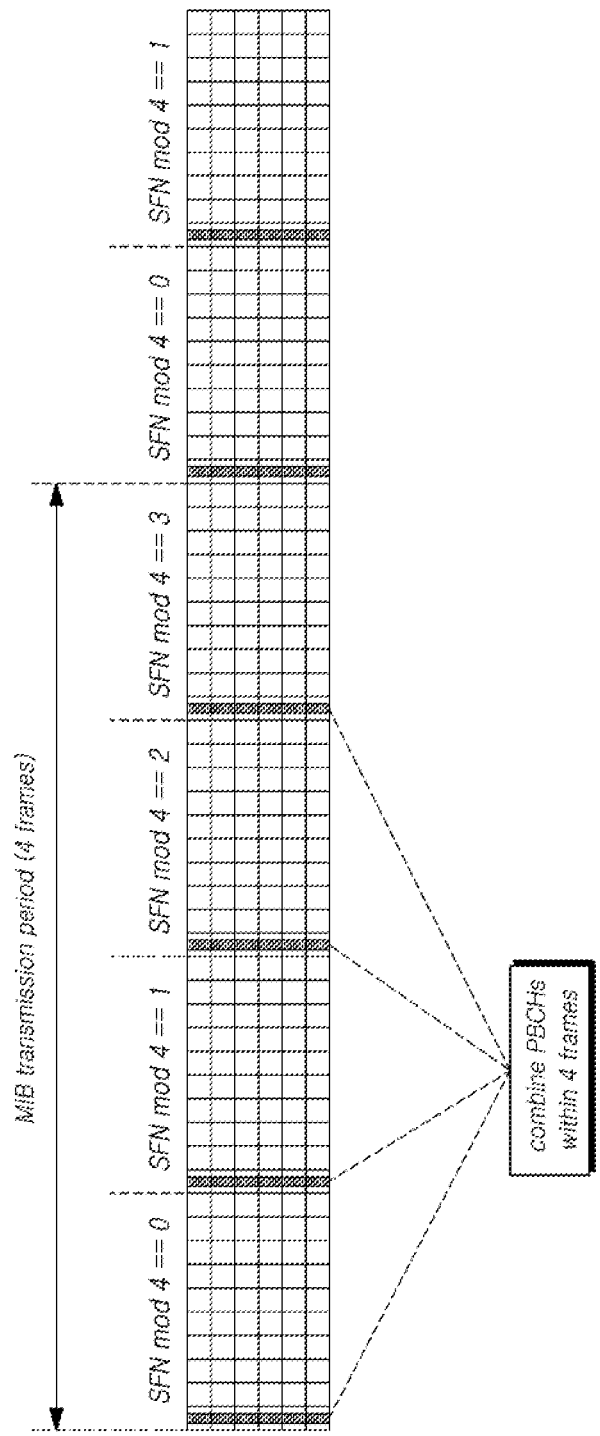
FIG. 4 illustrates resources for transmitting PBCH.

FIG. 4 illustrates resources for transmitting PBCH.

Referring to FIG. 4, the PBCH may be located at a first subframe of each frame on a time axis and at 6 Resource Blocks (RBs) or 72 subcarriers on a frequency axis. With respect to 1920-bit code word, every 480 bits are transmitted in first subframes of respective four frames. Accordingly, the MIB transmitted to the PBCH is changed when a System Frame Number (SFN) mode 4=0, and the MIB is transmitted using only no. 0 subframe (SF#0) in every frame. Further, the MIB is transmitted using only four OFDM symbols having OFDM symbol indexes i (i=0, 1, 2 ... 13) of 7, 8, 9, and 10 among 14 OFDM symbols of SF#0.

Transmitted 480-bit code words consist of code words of which each can be decoded. The UE may decode PBCH code words transmitted on four frame periods by combining reception values of code words transmitted within the corresponding period.

Accordingly, when a channel state between the BS and the UE is good, the decoding can be succeeded using reception values of code words transmitted in one frame alone. Otherwise, the decoding is highly likely to be succeeded only when reception values of code words transmitted in a maximum of four frames are combined.

In addition to the MIB transmitted to the PBCH, other system information that the BS transmits to the PDSCH is referred to as System Information Block (SIB). The SIB has various SIB types according to the type of transmitted information as shown in Table 3 below.

TABLE 3

| SIB | Description of SIB type |
| --- | --- |
| SIB1 | System Information Block Type 1 (SIB1), which contains parameters needed to determine if a cell is suitable for cell selection, as well as information about the time domain scheduling of the other SIBs. |
| SIB2 | System Information Block Type 2 (SIB2), which includes common and shared channel information. |
| SIB3-SIB8 | SIB3-SIB8, which include parameters used to control intra-frequency, inter-frequency and inter-RAT cell reselection. |
| SIB9 | SIB9, which is used to signal the name of a Home eNodeB (HeNBs). |
| SIB10-SIB12 | SIB10-SIB12, which include the Earthquake and Tsunami Warning Service (ETWS)notifications and Commercial Mobile Alert System (CMAS) warning messages |
| SIB13 | SIB13, which includes MBMS related control information |
| SIB14 | SIB14, which contains Extended Access Barring related information. |
| SIB15 | SIB15, which contains the MBMS Service Area Identities (SAI) of the current and/or neighboring carrier frequencies. |
| SIB16 | SIB16, which contains information related to GPS time and Coordinated Universal Time (UTC). |

Among the 16 type SIBs, SIB1 uses fixed time domain scheduling similar to the MIB. First, a transmission period of one SIB1 is 8 frames (80 ms) and transmission is performed through 4 frames that correspond to SFN mod 2=0. In a frame in which SIB1 is transmitted, only SF#5 is used for SIB1 transmission. Further, the UE acquires frequency domain scheduling information on the transmitted SIB1 by decoding DCI of a PDCCH transmitted to SF#5. The UE blindly decodes the DCI by using an SI-RNTI.

Next, a scheduling method of other SIBs (SIB2 to SIB16) except for SIB1 to will be described. Time domain scheduling information of the other SIBs is transmitted to the UE through SIB1.

When acquiring an SI message, the UE 10 determines a start point of an SI window for relevant SI messages (start of SI messages). That is, in a list of the SI messages configured by schedulingInfoList of SystemInformationBlockType1, a number n corresponding to an order of the entry is determined and integer (integer value) x=(n−1)*w is determined with respect to the relevant SI message. At this time, w denotes a window length (si-WindowLength).

The SI window starts at subframe #a of the radio frame of SFN mod T=FLOOR(x/10). At this time, a=x mod 10 and T is a period of the relevant SI message (si-Periodicity).

The SI window of 1 ms is configured only when pieces of SI are scheduled before subframe #5 in the frame of SFN mod 2=0.

The UE receives the PDSCH by using the SI-RNTI from the start point of the SI window and continues the reception until a last time point of the SI window having a temporal absolute time of si-WindowLength or until the SI message is received. However, in the frame of SFN mod 2=0, subframe #5, all MBSFN subframes, and all uplink subframes in TDD are excluded.

When the SI message is not received until the last time point of the SI window, the reception is repeated in a next SI window for the relevant SI message.

In the aforementioned method, the UE acquires frequency domain scheduling information for SIB2 to SIB16 transmitted in the SI window by decoding DCI of the PDCCH transmitted in the subframe in which the corresponding SIB is transmitted. Further, since SIB1 corresponds to time domain scheduling information informed to the UE through an SI window W, information on subframes in which SIB2 to SIB 16 are transmitted may be acquired on when the UE succeeds in the blind decoding of the DCI.

Tables 4 and 5 below show a start subframe number of the SI window (SI-window starts at the subframe #a) and a location of a frame in which an SIB is transmitted (a location of a frame in which SI is transmitted, SFN mod T=FLOOR (x/10)) with respect to the SIB repeatedly transmitted on every period (si-Periodicity) T as described above.

TABLE 4

| n−1 | \multicolumn{7}{c}{W} |||||||
|---|---|---|---|---|---|---|---|
|  | 1 ms | 2 ms | 3 ms | 10 ms | 15 ms | 20 ms | 40 ms |
| 0 | 0 | 0 | 0 | 0 | 0 | 0 | 0 |
| 1 | 1 | 2 | 3 | 0 | 5 | 0 | 0 |
| 2 | 2 | 4 | 6 | 0 | 0 | 0 | 0 |
| 3 | 3 | 6 | 9 | 0 | 5 | 0 | 0 |
| 4 | 4 | 8 | 2 | 0 | 0 | 0 | 0 |
| 5 | 5 | 0 | 5 | 0 | 5 | 0 | 0 |

TABLE 5

| n−1 | \multicolumn{7}{c}{W} |||||||
|---|---|---|---|---|---|---|---|
|  | 1 ms | 2 ms | 3 ms | 10 ms | 15 ms | 20 ms | 40 ms |
| 0 | 0 | 0 | 0 | 0 | 0 | 0 | 0 |
| 1 | 0 | 0 | 0 | 1 | 1 | 2 | 4 |
| 2 | 0 | 0 | 0 | 2 | 3 | 4 | 8 |
| 3 | 0 | 0 | 0 | 3 | 4 | 6 | 12 |
| 4 | 0 | 0 | 1 | 4 | 6 | 8 | 16 |
| 5 | 0 | 1 | 1 | 5 | 7 | 10 | 20 |

A value of period (si-Periodicity)T is set as the same value among 8, 16, 32, 64, 128, 256, and 512 for every SIB (SIB2 to SIB16) or a plurality of pieces of SIB, and the value of period (si-Periodicity)T refers to a number of frames.

Figure 5:
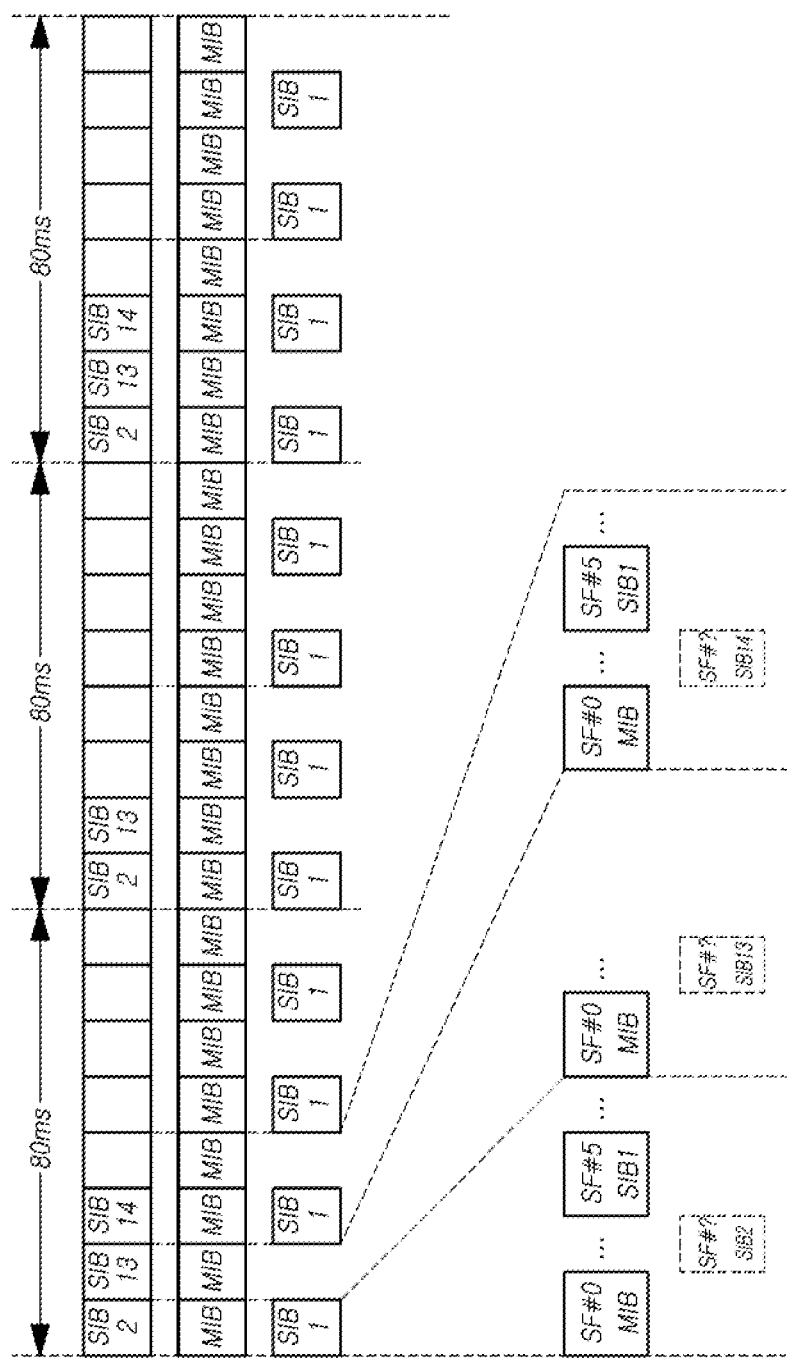
FIG. 5 is a view for describing system information time domain scheduling.

For example, when SIB scheduling information transmitted to the UE through SIB1 is as shown in Table 6 below, a location to which the SIB is transmitted is as FIG. 5. FIG. 5 is a view for describing system information time domain scheduling.

TABLE 6

| W = 10 ms |
|---|
| SIB2: n = 1, T = 8, a = 0, SFN mod T = 0 |
| SIB13: n = 2, T = 8, a = 0, SFN mod T = 1 |
| SIB14: n = 3, T = 16, a = 0, SFN mod T = 2 |

Next, a method of changing a system information message will be described.

Figure 6:
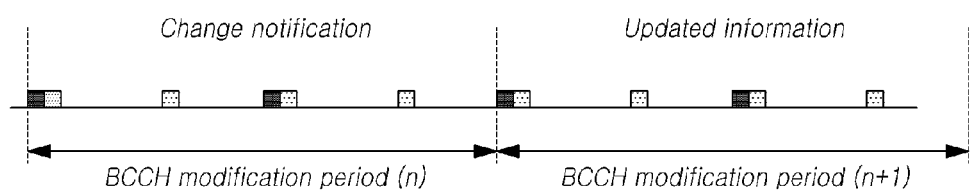
FIG. 6 is a view for describing change in system information.

FIG. 6 is a view for describing change in system information.

The change of system information occurs only in specific radio frames. That is, the concept of a modification period where system information is changed in a specific radio frame is used. The system information having the same content may be transmitted several times within the modification period according to definition made by scheduling. The modification period boundaries may be defined by SFN values for which SFN mod m=0, where m denotes the number of radio frames including the modification period. The modification period is configured by system information.

When the BS 20 changes system information, the BS 20 first informs the UE 10 of such a change. That is, this may be performed through the modification period. In a next modification period, the BS 20 may transmit updated system information. Different colors in FIG. 6 indicate different pieces of system information. The UE 10 immediately acquires new modification information from the beginning of the next modification period upon receiving a change notification. The UE 10 may apply the previously acquired system information until the UE 10 acquires new system information.

A paging message may be used for informing UEs in RRC_IDLE and UEs in RRC_CONNECTED of change in the system information. When the UE 10 receives a paging message including a specific parameter, for example, systemInfoModification, the UE 10 may be aware of that the system information is changed in a next modification period boundary. Although the UE 10 knows that the system information is changed, further details of the change in the system information may not be provided.

A specific parameter (e.g., SystemInformationBlockType1) may include a value tag (e.g., systemInfoValueTag) that informs of whether the change occurs in system messages. For example, the UE 10 my use the value tag (e.g., systemInfoValueTag) to verify whether the previously stored system information messages are still effective upon returning from out of coverage. In addition, unless specified after 3 hours passed from a moment of successfully identifying the system information is valid, the UE 10 may consider that the stored system information is invalid.

The UE 10 may combine reception values of PBCH code words transmitted in four frames corresponding to the PBCH transmission period. However, the UE 10 may not combine reception values of code words transmitted on the other PBCH transmission periods.

The BS 20 should repeatedly transmit PBCH, which is used to be transmitted in a typical method, 36 to 95 times in order to enable the MTC UE having the expanded coverage to receive the PBCH and to succeed in a blind decoding. In other words, in a typical method, the PBCH code words are used to be transmitted using four subframes over four frames. Such PBCH code words should be repeatedly transmitted using 144 to 384 subframes. In a case of FDD, if one frame consists of ten subframes and if the PBCH is transmitted using all of ten subframes in one frame, the MTC UE having the expanded coverage should use 15 to 39 frames for transmitting the PBCH.

As described above, when a large amount of transmission resources is used for the MTC UE having the expanded coverage, an amount of available transmission resources to be allocated to other UEs in the same cell becomes relatively reduced. Further, on characteristics of the periodically transmitted PBCH, when a transmission period of the PBCH for the MTC UE having the expanded coverage is too short or the PBCH is continuously transmitted to successive frames, other UEs may not receive transmission resources in the worst case. Available transmission resources to be allocated to the MTC UE having the expanded coverage for other physical channels except for the PBCH also become relatively reduced.

When most DL transmission resources are used for the terminal having the expanded coverage on every transmission period, PDSCH transmission resources for Dedicated Traffic CHannel (DTCH) transmission to each UE become relatively lack in the system information.

In order to solve the problem, a method of intermittently repeatedly transmitting the system information is proposed. More specifically, the system information is intermittently repeatedly transmitted for the UE having the expanded coverage only on a specific transmission period and is transmitted through the same method as the typical method on periods other than the specific system information transmission period. This is referred to as an "intermittently repetitive system information transmission method" or an "intermittently repetitive PBCH transmission method".

A maximum number of PRB pairs which can be allocated to the MTC UE in the frequency domain is 6, and 6 successive PRBs (or PRB pairs) are called a Narrow Band (NB) used by the MTC UE. Table 7 shows the number of PRBs included in transmission resources of the frequency domain for each system BW.

TABLE 7

| BW | 1.4 MHz | 3 MHz | 5 MHz | 10 MHz | 15 MHz | 20 MHz |
|---|---|---|---|---|---|---|
| $N_{PRB}$ | 6 | 15 | 25 | 50 | 75 | 100 |

As SI transmitted to the MTC UE, transmission resources of the frequency domain are allocated in the unit of NBs. Table 8 shows, when NBs of frequency resources are configured in the unit of 6 successive PRBs, the number of NBs and the number of remaining PRBs that are not included in the NB.

TABLE 8

| BW | $N_{NB}$ | #Remaining PRBs |
|---|---|---|
| 1.4 MHz | 1 | 0 |
| 3 MHz | 2 | 3 |
| 5 MHz | 4 | 1 |
| 10 MHz | 8 | 2 |
| 15 MHz | 12 | 3 |
| 20 MHZ | 16 | 4 |

First, MTC SIB1 is MTC SI that the MTC UE first receives after receiving the MIB. In the present disclosure, MTC SIB1 uses fixed time domain scheduling through a method similar to that of typical SIB 1. In other words, at least one of a radio frame period, a single subframe, and a plurality of subframes to be used for MTC SIB1 transmission with the period is predefined. The BS transmits MTC SIB1 to the predefined subframe. The BS requires repetitive transmission of MTC SIB1 for the MTC UE having the expanded coverage. A transmission period $T_{SIB1bis}$ of MTC SIB1 is defined as 8 radio frames.

When the system BW is higher than or equal to 5 MHz and when MTC SIB1 is repeatedly transmitted, a frequency hopping method of using different NBs by hopping frequency transmission resources in different subframes uses two or four NBs according to the system BW.

number of frequency hopping NBs $N_{FH}=2$ for system BW of 12-50 RBs number of frequency hopping NBs $N_{FH}=4$ for system BW of 51-110 RBs Accordingly, there is need for a frequency hopping method that can be used for the repetitive transmission of MTC SIB1.

The present disclosure relates to a method of transmitting system information for the MTC UE having the expanded coverage and, more particularly, to a method of setting transmission resources for transmitting system information and a frequency hopping method.

The present disclosure proposes a frequency hopping method for repeatedly transmitting MTC SIB1 for the MTC UE having the expanded coverage.

As shown in Table 8, the number of NBs which can be used for repetitive transmission of MTC SIB1, $N_{NB}$=4, 8, 12, or 16 according to the system BW. Accordingly, $N_{NB}$ adjacent BS cells may transmit MTC SIB1 in the same subframe by using different NBs. In other words, to avoid interference between MTC SIB1 transmitted by adjacent BS cells, the adjacent BS cells may use not overlapped NBs.

However, the frequency hopping pattern should be designed such that the $N_{NB}$ adjacent BS cells may repeatedly transmit MTC SIB1 by using different NBs with respect to a subframe repeatedly transmitted through frequency hopping.

Embodiment 1: NB Index of First Subframe

In the present disclosure, a NB to be used in a first subframe for transmitting MTC SIB1 on every transmission period of MTC SIB1 may be determined using a Physical Cell ID (PCID) of each cell and the number of NBs (e.g., $N_{NB}$) according to the system BW, as follows. The NB index $NBidx_{1st}$ used in the first subframe may be determined as follows.

Embodiment 1-1

The NB index (e.g., $NBidx_{1st}$) used in the first subframe uses a result of a modulo operation of the PCID and the number of NBs (e.g., $N_{NB}$) for each system BW as shown in equation (1).

$$NBidx_{1st} = PCID \bmod N_{NB} \qquad (1)$$

Embodiment 1-2

In a case of a CRS, when results of operations of PCID mod 3 of adjacent cells are different, different Resource Elements (REs) are used for CRS transmission. Accordingly, in determination of the PCID, the PCID is determined such that results of PCID mode 3 have different values with respect to PCIDs of adjacent cells. At this time, in embodiment 1-1, results of operations of PCID mod 3 have different values or $NBidx_{1st}$ has the same value. Accordingly, interference is not generated between CRSs transmitted by adjacent cells but is generated between MTC SIB1.

TABLE 9

| PCID | PCID mod 3 | NBidx__1st |
|------|-----------|-----------|
| 0 | 0 | 0 |
| 4 | 1 | 0 |
| 8 | 2 | 0 |
| 12 | 0 | 0 |

TABLE 9-continued

| PCID | PCID mod 3 | NBidx__1st |
|------|-----------|-----------|
| 16 | 1 | 0 |
| 20 | 2 | 0 |

In order to solve the problem, in embodiment 1-2, a result of the modulo operation of the PCID and a multiple of 3 is used to determine $NBidx_{1st}$. Equation (2) below corresponds to an embodiment 1-2 and uses a result of the modulo operation of the PCID and a maximum value of the multiples of 3, which are equal to or smaller than $N_{NB}$, is used as $NBidx_{1st}$.

$$NBidx_{1st} = PCID \bmod \left( \left\lfloor \frac{N_{NB}}{3} \right\rfloor * 3 \right) \qquad (2)$$

Embodiment 1-3

Since different subframes are used for transmission according to whether the value of the PCID is an even number or an odd number in the time domain, a result of the modulo operation of floor (PCID/2) and the number of NBs ($N_{NB}$) for each system BW is used as $NBidx_{1st}$ as shown in equation (3) below.

$$NBidx_{1st} = \left\lfloor \frac{PCID}{2} \right\rfloor \bmod N_{NB} \qquad \text{[Equation 3]}$$

Embodiment 1-4

Since different subframes are used for transmission according to whether the value of the PCID is an even number or an odd number in the time domain, a result of the modulo operation of floor (PCID/2) and a maximum value of multiples of 3 equal to or smaller than $N_{NB}$ like in embodiment 1-2 is used as $NBidx_{1st}$ as shown in equation (4) below.

$$NBidx_{1st} = \left\lfloor \frac{PCID}{2} \right\rfloor \bmod \left( \left\lfloor \frac{N_{NB}}{3} \right\rfloor * 3 \right) \qquad (4)$$

Embodiment 2: NB Index Used in Frequency Hopping

Next, a method of determining an NB index used in a subframe for repeatedly transmitting MTC SIB1 is described. In the present disclosure, the NB index to be used for frequency hopping including first $NBidx_{1st}$ used in MTC SIB1 transmission within the MTC SIB1 transmission period may be defined as a function of System Frame Number (SFN) $n_f$, subframe index $n_{sf}$ within a radio frame (here, $$n_{sf} = \left\lfloor \frac{n_s}{2} \right\rfloor$$

and $n_s$ denotes a slot index within the radio frame), and a frequency hopping period $Y_{CH}$.

Embodiment 2-1

Equation (5) below defines NB hopping by $N_{NB}/N_{FH}$ on every frequency hopping period starting from $NBidx_{1st}$.

$$NBidx = \left(NBidx_{1st} + \frac{N_{NB}}{N_{FH}} * \left\lfloor \frac{(n_f \bmod T_{SIB1bis}) * 10 + n_{sf}}{Y_{CH}} \right\rfloor \right) \bmod N_{NB} \quad (5)$$

In embodiment 2-1, when the frequency hopping period corresponds to one radio frame, in other words, $Y_{CH}=10$, equation (5) may be expressed like equation (6) below.

$$NBidx = \left(NBidx_{1st} + \frac{N_{NB}}{N_{FH}} * n_f\right) \bmod N_B \quad (6)$$

A frequency hopping pattern of embodiment 2-1 is as shown in Tables 10 to 13.

TABLE 10

$N_{NB} = 4$,

| Frequency hopping period# | PCID mode 4 | | | |
|---|---|---|---|---|
| | 0 | 1 | 2 | 3 |
| 0 | 0 | 1 | 2 | 3 |
| 1 | 2 | 3 | 0 | 1 |

TABLE 11

$N_{NB} = 8$,

| Frequency hopping period# | PCID mode 8 | | | | | | | |
|---|---|---|---|---|---|---|---|---|
| | 0 | 1 | 2 | 3 | 4 | 5 | 6 | 7 |
| 0 | 0 | 1 | 2 | 3 | 4 | 5 | 6 | 7 |
| 1 | 4 | 5 | 6 | 7 | 0 | 1 | 2 | 3 |

TABLE 12

$N_{NB} = 12$,

| Frequency hopping period# | PCID Mode 12 | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | 8 | 9 | 10 | 11 |
| 1 | 3 | 4 | 5 | 6 | 7 | 8 | 9 | 10 | 11 | 0 | 1 | 2 |
| 2 | 6 | 7 | 8 | 9 | 10 | 11 | 0 | 1 | 2 | 3 | 4 | 5 |
| 3 | 9 | 10 | 11 | 0 | 1 | 2 | 3 | 4 | 5 | 6 | 7 | 8 |

TABLE 13

$N_{NB} = 16$,

| Frequency hopping period# | PCID mode 16 | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 4 | 5 | 6 | 7 | 8 | 9 | 10 | 11 | 12 | 13 | 14 | 15 | 0 | 1 | 2 | 3 |
| 2 | 8 | 9 | 10 | 11 | 12 | 13 | 14 | 15 | 0 | 1 | 2 | 3 | 4 | 5 | 6 | 7 |
| 3 | 12 | 13 | 14 | 15 | 0 | 1 | 2 | 3 | 4 | 5 | 6 | 7 | 8 | 9 | 10 | 11 |

Embodiment 2-2

In $N_{FH}=4$, the frequency hopping may be defined to alternate $N_{NB}/2$ and $N_{NB}/4$ as shown in equation (7) below.

$$NBidx = \left(NBidx_{1st} + \frac{N_{NB}}{2} * \left\lfloor \frac{(n_f \bmod T_{SIB1bis}) * 10 + n_{sf}}{Y_{CH}} \right\rfloor + \alpha \right) \bmod N_{NB} \quad (7)$$

If $N_{FH} = 2$, $\alpha = 0$

Otherwise, $$\alpha = \left(\frac{N_{NB}}{4} * \left\lfloor \frac{\left\lfloor \frac{(n_f \bmod T_{SIB1bis}) * 10 + n_{sf}}{Y_{CH}} \right\rfloor \bmod 4}{2} \right\rfloor \right)$$

A frequency hopping pattern of embodiment 2-2 is as shown in Tables 14 and 15 below.

TABLE 14

$N_{NB} = 12$,

| Frequency hopping period# | PCID mode 12 | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | 8 | 9 | 10 | 11 |
| 1 | 6 | 7 | 8 | 9 | 10 | 11 | 0 | 1 | 2 | 3 | 4 | 5 |
| 2 | 3 | 4 | 5 | 6 | 7 | 8 | 9 | 10 | 11 | 0 | 1 | 2 |
| 3 | 9 | 10 | 11 | 0 | 1 | 2 | 3 | 4 | 5 | 6 | 7 | 8 |

TABLE 15

$N_{NB} = 16$,

| Frequency hopping period# | PCID mode 16 | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 8 | 9 | 10 | 11 | 12 | 13 | 14 | 15 | 0 | 1 | 2 | 3 | 4 | 5 | 6 | 7 |
| 2 | 4 | 5 | 6 | 7 | 8 | 9 | 10 | 11 | 12 | 13 | 14 | 15 | 0 | 1 | 2 | 3 |
| 3 | 12 | 13 | 14 | 15 | 0 | 1 | 2 | 3 | 4 | 5 | 6 | 7 | 8 | 9 | 10 | 11 |

Embodiment 2-3

In $N_{FH}=4$, the same hopping pattern is repeated over four frequency hopping periods in embodiment 2-1 and embodiment 2-2. Embodiment 2-3 is expanded such that the same hopping pattern is repeated over eight repetitive hopping periods of the frequency hopping pattern, and may be expressed as equation (8) below.

$$NBidx = \left(\left(NBidx_{1st} + \frac{N_{NB}}{2} * \left\lfloor \frac{(n_f \bmod T_{SIB1bis})*10 + n_{sf}}{Y_{CH}} \right\rfloor \right) + \alpha \right) \bmod N_{NB} \quad (8)$$

If $N_{FH} = 2$, $\alpha = 0$

Otherwise, $$\alpha = \left(\frac{N_{NB}}{4} * \left\lfloor \frac{(n_f \bmod T_{SIB1bis})*10 + n_{sf}}{2*Y_{CH}} \right\rfloor \right)$$

A frequency hopping pattern of embodiment 2-3 is as shown in Tables 16 and 17 below.

TABLE 16

$N_{NB} = 12$,

| Frequency hopping period# | PCID Mode 12 | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | 8 | 9 | 10 | 11 |
| 1 | 6 | 7 | 8 | 9 | 10 | 11 | 0 | 1 | 2 | 3 | 4 | 5 |
| 2 | 3 | 4 | 5 | 6 | 7 | 8 | 9 | 10 | 11 | 0 | 1 | 2 |
| 3 | 9 | 10 | 11 | 0 | 1 | 2 | 3 | 4 | 5 | 6 | 7 | 8 |
| 4 | 6 | 7 | 8 | 9 | 10 | 11 | 0 | 1 | 2 | 3 | 4 | 5 |
| 5 | 0 | 1 | 2 | 3 | 4 | 5 | 6 | 7 | 8 | 9 | 10 | 11 |

TABLE 16-continued $N_{NB} = 12$,

| Frequency hopping period# | PCID Mode 12 | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 6 | 9 | 10 | 11 | 0 | 1 | 2 | 3 | 4 | 5 | 6 | 7 | 8 |
| 7 | 3 | 4 | 5 | 6 | 7 | 8 | 9 | 10 | 11 | 0 | 1 | 2 |

TABLE 17

$N_{NB} = 16$,

| Frequency hopping period# | PCID mode16 | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 8 | 9 | 10 | 11 | 12 | 13 | 14 | 15 | 0 | 1 | 2 | 3 | 4 | 5 | 6 | 7 |
| 2 | 4 | 5 | 6 | 7 | 8 | 9 | 10 | 11 | 12 | 13 | 14 | 15 | 0 | 1 | 2 | 3 |
| 3 | 12 | 13 | 14 | 15 | 0 | 1 | 2 | 3 | 4 | 5 | 6 | 7 | 8 | 9 | 10 | 11 |
| 4 | 8 | 9 | 10 | 11 | 12 | 13 | 14 | 15 | 0 | 1 | 2 | 3 | 4 | 5 | 6 | 7 |
| 5 | 0 | 1 | 2 | 3 | 4 | 5 | 6 | 7 | 8 | 9 | 10 | 11 | 12 | 13 | 14 | 15 |
| 6 | 12 | 13 | 14 | 15 | 0 | 1 | 2 | 3 | 4 | 5 | 6 | 7 | 8 | 9 | 10 | 11 |
| 7 | 4 | 5 | 6 | 7 | 8 | 9 | 10 | 11 | 12 | 13 | 14 | 15 | 0 | 1 | 2 | 3 |

Embodiment 2-4

6 PRBs at the center of the system BW are used for PBCH and PSS/SSS transmission. When MTC SIB1 is repeatedly transmitted to the same subframe to which the PBCH and the PSS/SSS are transmitted, transmission data of MTC SIB1 may be punctured and transmitted with respect to transmission resources used for PBCH and PSS/SSS transmission in the same method as the typical method.

In another method, the NB overlapping the PBCH and PSS/SSS transmission may not be used for MTC SIB1 transmission. In this case, the number of NBs $N'_{NB}$ used for repetitive MTC SIB1 transmission and frequency hopping is as shown in Table 18 below.

TABLE 18

| BW | $N'_{NB}$ |
|---|---|
| 5 MHz | 2 |
| 10 MHz | 6 |
| 15 MHz | 10 |
| 20 MHz | 14 |

Table 19 below shows a relationship between a new NB index NBindex' used for configuring the frequency hopping pattern and an NB index NBindex used for actual MTC SIB1 transmission. Accordingly, in embodiment 2-4, the NB index used for actual MTC SIB1 transmission is found and used by configuring a frequency hopping pattern by using NBindex' and mapping the frequency hopping pattern to Table 19 below.

TABLE 19

| NBindex' | NBindex | | | |
|---|---|---|---|---|
| | 5 MHz | 10 Mhz | 15 Mhz | 20 Mhz |
| 0 | 0 | 0 | 0 | 0 |
| 1 | 3 | 1 | 1 | 1 |
| 2 | | 2 | 2 | 2 |
| 3 | | 5 | 3 | 3 |
| 4 | | 6 | 4 | 4 |
| 5 | | 7 | 7 | 5 |
| 6 | | | 8 | 6 |
| 7 | | | 9 | 9 |
| 8 | | | 10 | 10 |
| 9 | | | 11 | 11 |
| 10 | | | | 12 |
| 11 | | | | 13 |
| 12 | | | | 14 |
| 13 | | | | 15 |

In embodiment 2-4, in a case where $N_{FH}=4$ by generalizing the equation of embodiment 2-2 when $N'_{NB}$ is not a multiple of 4 as shown in Table 19, the frequency hopping may be defined to alternate $N'_{NB}/2$ and 13 NBs, which may be expressed as equation (9) below.

$$NBidx' = \left(NBidx'_{1st} + \frac{N'_{NB}}{2} * \left\lfloor \frac{(n_f \bmod T_{SIB1bis})*10 + n_{sf}}{Y_{CH}} \right\rfloor + \alpha \right) \bmod N'_{NB} \quad (9)$$

If $N_{FH} = 2$, $\alpha = 0$

Otherwise, $$\alpha = \left(\beta * \left\lfloor \frac{\left\lfloor \frac{(n_f \bmod T_{SIB1bis})*10 + n_{sf}}{Y_{CH}} \right\rfloor \bmod 4}{2} \right\rfloor \right)$$

In equation (9), β has a range of $0<\beta<N'_{NB}$. In order to implement a similar hopping pattern to that of embodiment 2-2, $$\beta = \left\lfloor \frac{N_{NB}}{4} \right\rfloor$$

or $$\left\lceil \frac{N_{NB}}{4} \right\rceil$$

may be used.

In this specification, equation ⌊ ⌋ indicates a descending operation (floor) and ⌈ ⌉ indicates an ascending operation (ceil).

Embodiment 2-5

In embodiment 2-5, equation (5) of embodiment 2-1 may be generalized and used as in equation (10) below with respect to a case where $N'_{NB}$ is not the multiple of 4 as shown in Table 19.

$$NBidx = \left(NBidx_{1st} + \left\lfloor \frac{N_{NB}}{N_{FH}} \right\rfloor * \left( \left\lfloor \frac{(n_f \bmod T_{SIB1bis})*10 + n_{sf}}{Y_{CH}} \right\rfloor \bmod N_{FH} \right) \right) \bmod N_{NB} \quad (10)$$

When the transmission period $T_{SIB1bis}$ corresponds to a multiple of the number of NBs (e.g., $N_{FH}$) of frequency hopping, equation (10) below may be simplified and used as in equation (11).

$$NBidx = \left(NBidx_{1st} + \left\lfloor \frac{N_{NB}}{N_{FH}} \right\rfloor * \left( \left\lfloor \frac{n_f *10 + n_{sf}}{Y_{CH}} \right\rfloor \bmod N_{FH} \right) \right) \bmod N_{NB} \quad (11)$$

Further, when the frequency hopping period corresponds to one radio frame, in other words, $Y_{CH}=10$, equation (11) may be expressed as in equation (12) below.

[Equation 12]

$$NBidx = \left(NBidx_{1st} + \left\lfloor \frac{N_{NB}}{N_{FH}} \right\rfloor * (n_f \bmod N_{FH}) \right) \bmod N_{NB} \quad (12)$$

When $T_{SIB1bis}=8$, $N_{NB}=4, 8, 12, 16$ according to the system BW, and $N_{FH}=2$ or 4, like in embodiment 2-1, a frequency hopping pattern of embodiment 2-5 has the same result as Table 10 of embodiment 2-1.

Embodiment 2-6

Embodiments 2-1 to 2-5 above have been described for system information transmission.

Embodiment 2-6 describes a method of applying and using embodiments 2-1 to 2-5 of the frequency hopping method for transmission of physical channel such as general PDSCH/PUSCH/MPDCCH.

First, $NBidx_{1st}$ is included in DCI and transmitted to the UE. $NBidx_{1st}$ may be used in a first frequency hopping period on which the physical channels such as PDSCH/PUSCH/MPDCCH are transmitted, and NBidx may be calculated and used in a subsequent frequency hopping period by modifying equation (10) and equation (13) of embodiment 2-5. Here, $n_{sf\_1st}$ corresponds to an index of a first subframe used in the first frequency hopping period in which the physical channels such as the PDSCH/PUSCH/MPDCCH are transmitted. A value of $N_{FH}$ may be fixed to 2 or 4 regardless of the system BW.

$$NBidx = \left(NBidx_{1st} + \left\lfloor \frac{N_{NB}}{N_{FH}} \right\rfloor * \left( \left\lfloor \frac{n_f *10 + n_{sf} - n_{sf,1st}}{Y_{CH}} \right\rfloor \bmod N_{FH} \right) \right) \bmod N_{NB} \quad (13)$$

Alternatively, in consideration of i) index $n_{f\_1st}$ of a first radio frame, which is used in the first frequency hopping period for transmitting the physical channels, such as the PDSCH/PUSCH/MPDCCH, and ii) index $n_{sf\_1st}$ of a first subframe, equation (14) below may be established.

$$NBidx = \qquad (14)$$
$$\left(NBidx_{1st} + \left\lfloor\frac{N_{NB}}{N_{FH}}\right\rfloor * \left(\left\lfloor\frac{(n_f - n_{f,1st})*10 + n_{sf} - n_{sf,1st}}{Y_{CH}}\right\rfloor \bmod N_{FH}\right)\right)$$
$$\bmod N_{NB}$$

Alternatively, in consideration of i) index $n_{f\_1st}$ of the first radio frame, which is used in the first frequency hopping period for transmitting the physical channels, such as the PDSCH/PUSCH/MPDCCH, and ii) index $n_{sf\_1st}$ of the first subframe, and iii) a maximum radio frame number 1023, equation (15) below may be established not to change the NB in the same frequency hopping period although the frequency hopping period is configured over a subframe of radio frame number 0, which is continuous to a subframe of radio frame number 1023.

$$NBidx = \left(NBidx_{1st} + \qquad (15)\right.$$
$$\left.\left\lfloor\frac{N_{NB}}{N_{FH}}\right\rfloor * \left(\left(\left\lfloor\frac{((n_f - n_{f,1st})*10 + n_{sf} - n_{sf,1st})\bmod 10240}{Y_{CH}}\right\rfloor\right)\right.\right.$$
$$\left.\left.\bmod N_{FH}\right)\right)\bmod N_{NB}$$

Figure 7:
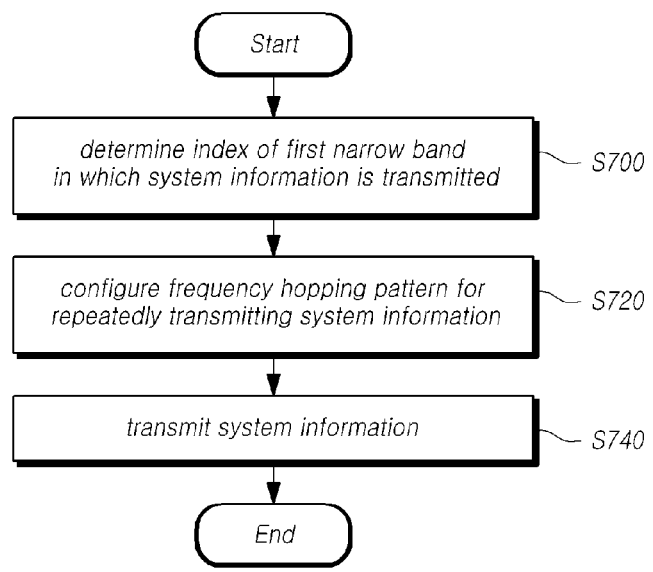
FIG. 7 is a flowchart illustrating a method of a BS for repeatedly transmitting system information according to an embodiment of the present disclosure.

FIG. 7 illustrates a method of a BS for repeatedly transmitting system information according to an embodiment of the present disclosure.

Referring to FIG. 7, the BS determines an index of a narrow band in a first subframe to be transmitted to the MTC UE in step S700.

The BS may determine an index of a first narrow band for transmitting system information based on a physical cell ID and the number of narrow bands according to a system bandwidth. For example, first system information may be transmitted to a narrow band having an index corresponding to a value of the modulo operation of the physical cell ID and the number of narrow bands according to the system bandwidth.

The BS configures a frequency hopping pattern based on an index of a narrow band for firstly transmitting system information, the number of narrow bands according to a system bandwidth, and the number of narrow bands used for frequency hopping in step S720.

The BS may configure a frequency hopping pattern by using i) a value of the modulo operation of a sum of the index of the narrow band for firstly transmitting the system information, ii) a value, which is generated by dividing the number of narrow bands according to the system bandwidth by the number of narrow bands used for frequency hopping, and iii) the number of narrow bands according to the system bandwidth.

At this time, the descending operation may be performed on the value generated by dividing the number of narrow bands according to the system bandwidth by the number of narrow bands used for frequency hopping.

When the number of narrow bands used for frequency hopping is larger than or equal to three, the frequency hopping pattern may be configured by repeating the aforementioned frequency hopping pattern configuration method.

That is, the narrow band having an index corresponding to a value of the modulo operation of a sum of an index of a narrow band for secondly transmitting system information and a value, which is generated by dividing the number of narrow bands according to the system bandwidth by the number of narrow bands used for frequency hopping, may be determined as a narrow band of a next subframe for transmitting the system information.

When the frequency hopping pattern is configured through the above process, the BS repeatedly transmits system information to the MTC UE through a narrow band indicated by an index according to the frequency hopping pattern.

Figure 8:
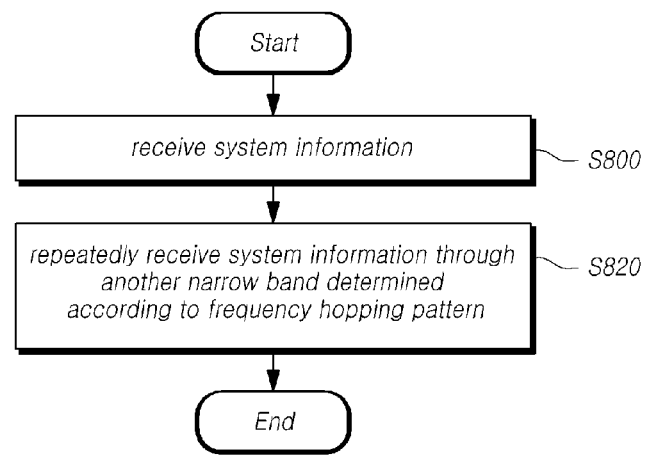
FIG. 8 is a flowchart illustrating a method of a UE for repeatedly receiving system information according to an embodiment of the present disclosure.

FIG. 8 illustrates a method of a UE for repeatedly receiving system information according to an embodiment of the present disclosure.

Referring to FIG. 8, the UE firstly receives system information through a narrow band determined by the BS in step S800.

A narrow band in a subframe used to firstly receive the system information may be a narrow band having an index corresponding to a value of the modulo operation of a physical cell ID and a number of narrow bands according to a system bandwidth by the BS.

After receiving the system information from the BS, the UE receives the system information through a narrow band according to a frequency hopping pattern determined by the BS in a next subframe in which the system information is repeatedly transmitted.

The narrow band used for transmitting the system information may be the narrow band having an index corresponding to i) a value of the modulo operation of a sum of an index of a narrow band used for firstly transmitting system information, ii) a value, which is generated by dividing the number of narrow bands according to the system bandwidth by the number of narrow bands used for frequency hopping, and iii) the number of narrow bands according to the system bandwidth.

The UE repeatedly receives system information according to a frequency hopping pattern determined by the BS, thereby avoiding interference of system information transmitted from an adjacent BS.

Figure 9:
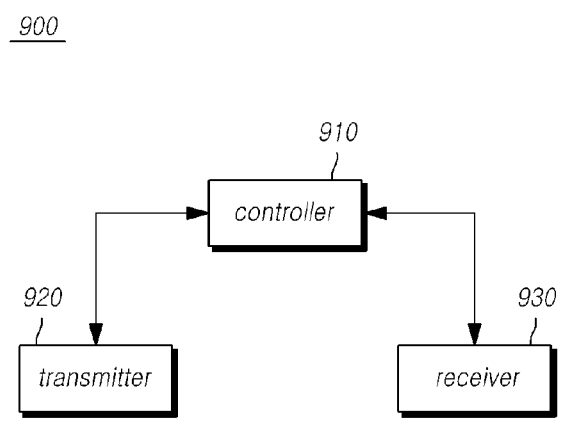
FIG. 9 illustrates a configuration of a BS according to an embodiment of the present disclosure.

FIG. 9 illustrates a configuration of a BS according to an embodiment of the present disclosure.

Referring to FIG. 9, a BS 900 according to an embodiment includes a controller 910, a transmitter 920, and a receiver 930.

The controller 910 may set transmission resources for transmitting system information for an MTC UE having an expanded coverage required for performing at least one of embodiments of the present disclosure and controls a general operation of the BS according to frequency hopping.

The controller 910 may determine a narrow band having an index corresponding to a value of the modulo operation of a physical cell ID and a number of narrow bands according to a system bandwidth as a narrow used for firstly transmitting system information.

Further, the controller may configure a frequency hopping pattern by using i) a value of the modulo operation of a sum of an index of the narrow band used for firstly transmitting the system information, ii) a value is generated by dividing the number of narrow bands according to the system bandwidth by a number of narrow bands used for frequency hopping, and iii) the number of narrow bands used for frequency hopping.

That is, the BS may determine an index of a first narrow band based on a physical cell ID and the number of narrow bands according to a system bandwidth and determines an index of a narrow band used for transmitting system information based on i) an index of a first narrow band, ii) the number of narrow bands according to the system bandwidth, and iii) the number of narrow bands used for frequency hopping, so as to configure a frequency hopping pattern.

The transmitter 920 and the receiver 930 are used for transmitting and receiving signals, messages, and data required for performing at least one embodiment of the present disclosure to and from the UE, and the transmitter 920 repeatedly transmits system information to the UE according to a frequency hopping pattern determined by the controller 910.

Figure 10:
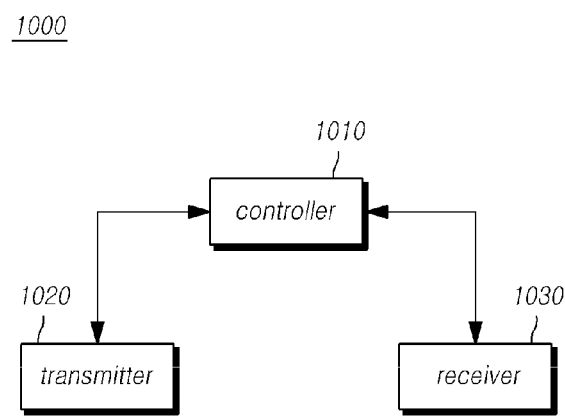
FIG. 10 illustrates a configuration of a UE according to an embodiment of the present disclosure.

FIG. 10 illustrates a configuration of a UE according to an embodiment of the present disclosure.

Referring to FIG. 10, a UE 1000 according to an embodiment includes a controller 1010, a transmitter 1020, and a receiver 1030.

The receiver 1030 may receive downlink control information, data, and a message from a base station through a corresponding channel.

Further, the controller 1010 may set transmission resources for transmitting system information for an MTC UE having an expanded coverage required for performing at least one embodiment of the present disclosure and controls a general operation of the UE according to frequency hopping.

The transmitter 1020 may transmit uplink control information, data, and a message to the BS through a corresponding channel.

The system information, which the UE 1000 receives or repeatedly receives from the BS, is received according to a frequency hopping pattern determined by the BS.

An index of a narrow band of a subframe used for firstly transmitting system information is determined as a value of the modulo operation of a physical cell ID of the BS and a number of narrow bands according to a system bandwidth.

Indexes of the remaining narrow bands configuring the frequency hopping pattern are determined based on i) the index of the narrow band of the subframe used for firstly transmitting the system information, ii) the number of narrow bands according to the system bandwidth, and iii) a number of narrow bands used for frequency hopping.

The UE receives system information through a narrow band corresponding to the index of the narrow band included in the frequency hopping pattern.

The standard content or standard documents mentioned in the above embodiments are omitted to simplify the description of the specifications and constitute a part of the specifications. Accordingly, addition of the standard content or some contents of the standard documents to the specifications or description thereof in the claims should be construed as the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, exemplary aspects of the present invention have not been described for limiting purposes. The scope of the present invention shall be construed on the basis of the accompanying claims in such a manner that all of the technical ideas included within the scope equivalent to the claims belong to the present invention.

What is claimed is:

1. A method of repeatedly transmitting system information by a Base Station (BS), the method comprising:
   determining an index of a first narrow band configuring a frequency hopping pattern based on a physical cell ID and a number of narrow bands according to a system bandwidth;
   determining indexes of remaining narrow bands configuring the frequency hopping pattern based on the physical cell ID, the number of narrow bands according to the system bandwidth, and a number of narrow bands used for frequency hopping; and
   repeatedly transmitting the system information through a narrow band corresponding to the index of the narrow band configuring the frequency hopping pattern.

2. The method of claim 1, wherein the determining of an index of a first narrow band comprises:
   determining the index of the first narrow band by using a modulo result value obtained by performing a modulo operation on the physical cell ID by the number of narrow bands according to the system bandwidth.

3. The method of claim 1, wherein the determining of indexes of remaining narrow bands comprises:
   generating a first value using a first modulo operation on the physical cell ID by the number of narrow bands according to the system bandwidth;
   generating a second value which is a multiple of a descending operation result value, which is generated by performing a descending operation on a division operation result value, which is generated by dividing the number of narrow bands according to the system bandwidth by the number of narrow bands used for the frequency hopping;
   generating a third value which is a sum of the first value and the second value; and
   determining the indexes of the remaining narrow bands by using a second modulo operation on the third value by the number of narrow bands according to the system bandwidth.

4. The method of claim 1, wherein:
   the number of narrow bands used for the frequency hopping is 2 when the system bandwidth is larger than or equal to 12 resource blocks and equal to or smaller than 50 resource blocks; and
   the number of narrow bands used for the frequency hopping is 4 when the system bandwidth is larger than 50 resource blocks.

5. The method of claim 1, wherein the frequency hopping pattern is configured to exclude two narrow bands among narrow bands included in each subframe.

6. A method of repeatedly receiving system information by a User Equipment (UE), the method comprising:
   firstly receiving the system information through a narrow band of an index determined based on a physical cell ID and a number of narrow bands according to a system bandwidth; and
   receiving the system information through the narrow band of the index determined based on the physical cell ID, the number of narrow bands according to the system bandwidth, and a number of narrow bands used for frequency hopping.

7. The method of claim 6, wherein the firstly receiving of system information comprises:
   firstly receiving the system information through the narrow band of the index determined by using a modulo result value obtained by performing a modulo operation on the physical cell ID by the number of narrow bands according to the system bandwidth.

8. The method of claim 6, wherein the firstly receiving a system information comprises:
   receiving the system information through a narrow band having an index corresponding to a value of a second modulo operation of a sum of a value of a first modulo operation of the physical cell ID and the number of narrow bands according to the system bandwidth and a multiple of a descending operation result value, which is generated by performing a descending operation on a division operation result value that is generated by dividing the number of narrow bands according to the system bandwidth by the number of narrow bands used for the frequency hopping, and (ii) the number of narrow bands according to the system bandwidth.

9. The method of claim 6, wherein:
the number of narrow bands used for the frequency hopping is 2 when the system bandwidth is larger than or equal to 12 resource blocks and equal to or smaller than 50 resource blocks; and
the number of narrow bands used for the frequency hopping is 4 when the system bandwidth is larger than 50 resource blocks.

10. The method of claim 6, wherein the system information is received through other narrow bands except for two narrow bands among narrow bands included in each subframe.

11. A User Equipment (UE) for repeatedly receiving system information, wherein the UE is configured to:
firstly receive system information through a narrow band of an index determined based on a physical cell ID and a number of narrow bands according to a system bandwidth; and
receive the system information through the narrow band of the index determined based on the physical cell ID, the number of narrow bands according to the system bandwidth, and a number of narrow bands used for frequency hopping.

12. The UE of claim 11, wherein the UE is configured to firstly receive the system information through the narrow band of the determined index by using a modulo result value obtained by performing a modulo operation on the physical cell ID by the number of narrow bands according to the system bandwidth.

13. The UE of claim 11, wherein the UE is configured to receive the system information through a narrow band having an index corresponding to a value of a second modulo operation of a sum of a value of a first modulo operation of the physical cell ID and the number of narrow bands according to the system bandwidth and a multiple of a descending operation result value, which is generated by performing a descending operation on a division operation result value that is generated by dividing the number of narrow bands according to the system bandwidth by the number of narrow bands used for the frequency hopping, and (ii) the number of narrow bands according to the system bandwidth.

14. The UE of claim 11, wherein:
the number of narrow bands used for the frequency hopping is 2 when the system bandwidth is larger than or equal to 12 resource blocks and equal to or smaller than 50 resource blocks; and
the number of narrow bands used for the frequency hopping is 4 when the system bandwidth is larger than 50 resource blocks.

15. The UE of claim 11, wherein the UE is configured to receive the system information through other narrow bands except for two narrow bands among narrow bands of each subframe.

* * * * *